T. N. Morse,
Wool Press.
Nº 48,705. Patented July 11, 1865.
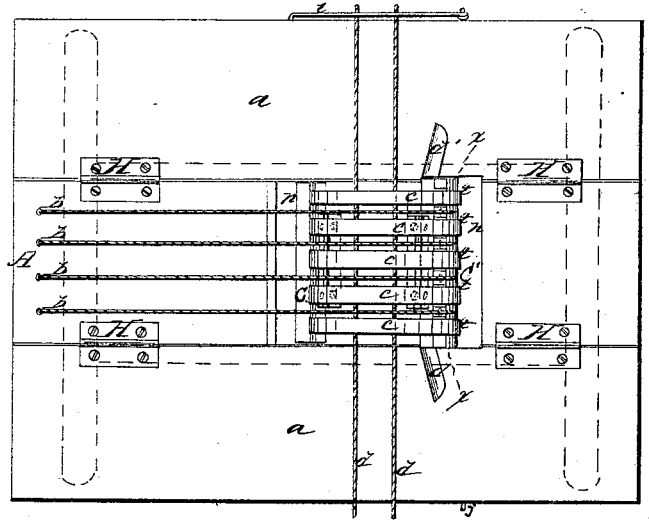
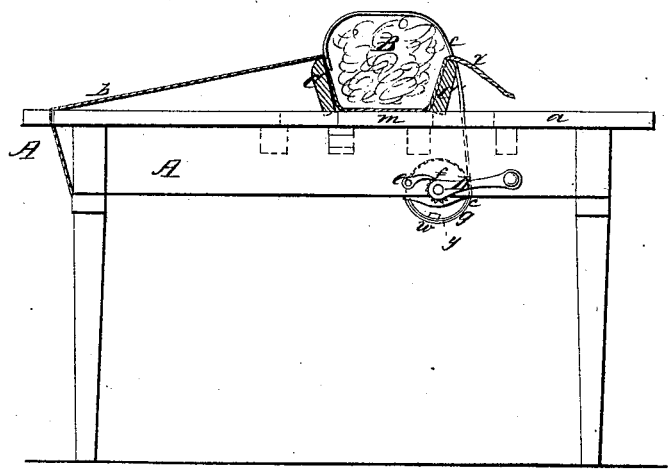
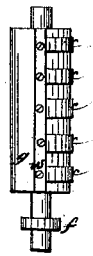
Witnesses.
Theo Tusch
C. L. Topliff
Inventor.
Thomas N. Morse
per Munn & Co
att'ys

UNITED STATES PATENT OFFICE.

THOMAS N. MORSE, OF GRATTAN, MICHIGAN.

IMPROVEMENT IN WOOL-PRESSES.

Specification forming part of Letters Patent No. 48,705, dated July 11, 1865.

*To all whom it may concern:*

Be it known that I, THOMAS N. MORSE, of Grattan, in the county of Kent and State of Michigan, have invented a new and useful Improvement in Machines for Putting up Fleeces of Wool; and I do hereby declare that the following is a full, clear, and exact description thereof, which will enable those skilled in the art to make and use the same, reference being had to the accompanying drawings, forming part of this specification, in which—

Figure 1 is a plan of my machine. Fig. 2 is a side view thereof, showing a fleece upon the table. Fig. 3 is a detached view of the windlass.

Similar letters of reference indicate corresponding parts.

The object of the machine is to put up fleeces in a square or nearly square form, and the improvements which I have made therein over machines now in use for the same purpose are hereinafter set forth.

A is a table which contains the operating parts of the machine. It has leaves $a$ at its sides turning up on hinges H. The leaves are to be secured in a vertical position, when a fleece is being put up, by means of one or more hooks, $i$, on one leaf taking into eyes $j$ on the other leaf. The center fixed part of the table has recesses or mortises $n$ $n$ cut therein, which extend clear across it. They are separated by the solid part $m$ of the table, and have transverse leaves C C' fitted in them, which are hinged to the part $m$ by metallic hinges, like those shown at H, so that they also can turn up at right angles with the table. One of them, C', is wider than the solid part $m$ of the table, and the inner or hinged edges of the leaves $a$ are cut away along the line of the transverse leaf C' to allow its ends to lie flush with the table. The edges of the leaves C C' are beveled or rounded off, as shown in the figures. The faces of the leaves $a$ are also grooved at $d'$, so that when the transverse leaves are in the position shown in Fig. 2 the side leaves can be set upright also, the ends of the leaf C' fitting into the grooves $d'$ which operate to hold it upright, and thus relieve the straps $c$ and the windlass.

$d$ $d$ are cords, which are cut of such a length as to reach across the table, to which they are secured by forcing them into shallow grooves on the edges of the leaves $a$, where they remain until wanted in the operation of tying the fleece.

A windlass, $g$, supported in bearings made for it in the frame A' of the table, carries at one end a ratchet-wheel $f$ and crank D. A detent, $e$, fast to the framing A engages the ratchet and prevents the backward rotation of the windlass.

Bands or straps $c$, (five in number in the example here described,) of sufficient strength to give the desired compression to the fleece, are firmly attached at one end to the edge of the leaf C, at suitable intervals, so as to occupy a space about equal to the length of the leaf. The bands are then carried over and around the edge of the leaf C', sinking into grooves $t$, cut in its rounded edge, so that the bands are flush with the adjoining surface of the leaf, and thence pass around the windlass $g$, which lies directly beneath the leaf C'. The other ends of the bands are secured to a bar, W, of equal length with the windlass, which lies in a groove, $y$, of the same shape as the bar, cut longitudinally in the periphery of the windlass. When the bar lies in the groove its outer side, to which the ends of the bands are secured, must be flush with the periphery of the windlass.

Cords $b$ (four or more in number) are brought up from any receptacle below the table through the holes in one end of the table, so as to be in line with the intervals between the bands $c$. They are carried forward over the leaf C, between the bands $c$, and thence over the leaf C' and around its outer edge, on which they are fastened by pressing them down between spring-forks $x$, which are fixed on the edge of that leaf between the grooves $t$. The ends of the cords are carried a sufficient distance beyond the leaf C' to supply length for tying the fleece.

The operation is as follows: The leaves being all down and the cords $b$ and $d$ lying in proper positions thereon, and the windlass turned backward so as to slacken the bands, the operator lays a fleece or quantity of wool upon the center of the table under the bands and then turns the windlass so as to wind the bands about it. The strain on the bands will lift the leaf C and bring it to a position nearly vertical, while the leaf C' will be pressed up by the bands to a like position, its grooved surface slipping under the bands as they are strained around the windlass. When the fleece is sufficiently compressed in that direction the operator raises the leaves a and locks them by means of the hook i, the angular grooves d' receiving the projecting ends of the leaf C' and holding it securely. The cords b are then tied about the fleece and the windlass is turned back (the detent e being raised) until the bar W falls out of the groove Y, when it is raised to the surface of the table through the opening n, and the bands are carried over the fleece and laid upon the left end of the table. The cords d are then brought over and tied upon the fleece and the package is completed.

My machine works steadily by reason of the position of the windlass near the center of the length of the table. It will be observed that the fleece will be packed in the form nearly of a parallelogram, thereby giving it an advantage in storing away over fleeces done up in rolls or round packages.

I do not claim, broadly, the use of winding bands which may be hooked upon or unhooked from a windlass.

I claim as new and desire to secure by Letters Patent—

1. A machine for binding fleeces of wool, constructed and operated as shown, having bands C, which are attached to and detached from the windlass by means of a bar, W, and groove Y, substantially as and for the purposes above set forth.

2. The combination of the side leaves, a a, transverse leaf C', and grooves d' d', all constructed, arranged, and employed substantially as and for the purposes set forth.

THOMAS N. MORSE

Witnesses:
  W. L. ATKINS,
  D. E. SCAGEL.